United States Patent
Beall et al.

(10) Patent No.: US 11,932,582 B2
(45) Date of Patent: Mar. 19, 2024

(54) HONEYCOMB BODIES WITH CONTROLLED POROSITY GRADIENT AND FIRING METHODS THEREOF

(71) Applicant: CORNING INCORPORATED, Corning, NY (US)

(72) Inventors: Douglas Munroe Beall, Painted Post, NY (US); Elizabeth Marie Vileno, Corning, NY (US)

(73) Assignee: Corning Incorporated, Corning, NY (US)

( * ) Notice: Subject to any disclaimer, the term of this patent is extended or adjusted under 35 U.S.C. 154(b) by 575 days.

(21) Appl. No.: 17/256,903

(22) PCT Filed: Jun. 19, 2019

(86) PCT No.: PCT/US2019/037960
§ 371 (c)(1),
(2) Date: Dec. 29, 2020

(87) PCT Pub. No.: WO2020/005665
PCT Pub. Date: Jan. 2, 2020

(65) Prior Publication Data
US 2021/0317048 A1    Oct. 14, 2021

Related U.S. Application Data

(60) Provisional application No. 62/692,162, filed on Jun. 29, 2018.

(51) Int. Cl.
C04B 35/478   (2006.01)
C04B 35/64    (2006.01)
C04B 38/00    (2006.01)

(52) U.S. Cl.
CPC ........ *C04B 38/0009* (2013.01); *C04B 35/478* (2013.01); *C04B 35/64* (2013.01);
(Continued)

(58) Field of Classification Search
CPC ... C04B 38/0009; C04B 35/478; C04B 35/64; C04B 2235/3234; C04B 2235/6021;
(Continued)

(56) References Cited

U.S. PATENT DOCUMENTS 4,298,328 A   11/1981  Frost
4,349,329 A    9/1982  Naito et al.
(Continued)

FOREIGN PATENT DOCUMENTS

| EP | 2327945 A1 | 6/2011 | |
| WO | 2009/029276 A1 | 3/2009 | |
| WO | WO-2009029276 A1 * | 3/2009 | ........... B28B 11/243 |

OTHER PUBLICATIONS

International Search Report and Written Opinion of the International Searching Authority; PCT/US19/37960; dated Nov. 12, 2019; 16 Pages; European Patent Office.

*Primary Examiner* — Karl E Group
(74) *Attorney, Agent, or Firm* — Daniel J. Greenhalgh

(57) ABSTRACT

Ceramic honeycomb bodies with a matrix of intersecting walls having an interior portion with a first average bulk porosity, and a skin having a second average bulk porosity, wherein the second average bulk porosity is less than the first average bulk porosity. Methods of manufacturing a ceramic honeycomb bodies include providing a firing cycle for the ceramic honeycomb structure such that at least the skin of the honeycomb structure is subjected to a thermal spike in firing temperature while the interior portion of the matrix is subjected to a lesser spike in firing temperature.

15 Claims, 9 Drawing Sheets

(52) U.S. Cl.
CPC ............... *C04B 2235/3234* (2013.01); *C04B 2235/6021* (2013.01); *C04B 2235/6562* (2013.01); *C04B 2235/6565* (2013.01); *C04B 2235/6583* (2013.01)

(58) Field of Classification Search
CPC .... C04B 2235/6562; C04B 2235/6565; C04B 2235/6583
See application file for complete search history.

(56) References Cited

U.S. PATENT DOCUMENTS

| | | | |
|---|---|---|---|
| 6,803,087 B2 | 10/2004 | Brew et al. | |
| 7,138,003 B2 | 11/2006 | Ichikawa et al. | |
| 7,279,213 B2 | 10/2007 | Gulati et al. | |
| 7,413,717 B2 * | 8/2008 | Hirai | C04B 38/0009 422/177 |
| 7,597,948 B2 * | 10/2009 | Miller | B01D 46/2462 428/116 |
| 2004/0105956 A1 | 6/2004 | Ito et al. | |
| 2005/0106083 A1 * | 5/2005 | Hirai | C04B 35/195 428/116 |
| 2011/0121493 A1 * | 5/2011 | Saijo | F27D 11/02 264/434 |
| 2013/0307176 A1 * | 11/2013 | Bronfenbrenner | C04B 38/0006 264/43 |
| 2015/0050451 A1 * | 2/2015 | Yamayose | C04B 35/478 264/630 |

\* cited by examiner

HONEYCOMB BODIES WITH CONTROLLED POROSITY GRADIENT AND FIRING METHODS THEREOF

This is a national stage application under 35 U.S.C. § 371 of International Application No. PCT/US2019/037960, filed Jun. 19, 2019, which claims the benefit of priority under 35 U.S.C. § 119 of U.S. Provisional Application Ser. No. 62/692,162 filed on Jun. 29, 2018, the content of which are incorporated herein by reference in their entireties.

FIELD

The present disclosure relates to ceramic honeycomb bodies having controlled porosity in portions thereof, and methods of manufacturing such ceramic honeycomb bodies.

BACKGROUND

Ceramic honeycomb bodies have been used in applications such as in automotive exhaust after-treatment systems. For example, the ceramic honeycomb bodies can be used in catalytic converters or particulate filters.

SUMMARY

Ceramic honeycomb bodies can be made by preparing a honeycomb green body through mixing of inorganic materials with a liquid vehicle, an organic binder, extrusion aids, and optionally a pore-forming material, into a batch mixture. The honeycomb green body can then be formed from the batch mixture by extruding the batch mixture through an extrusion die to form the honeycomb green body. The honeycomb green body is then dried and subsequently fired in a furnace to produce a fired ceramic honeycomb body.

The fired ceramic honeycomb body may be subsequently further processed, for example by combining with a housing (e.g., a can), to provide an assembly that is suitable for use in automotive exhaust after-treatment systems, for example.

In some embodiments of this disclosure, a ramp-spike-soak firing cycle is used to treat a honeycomb green body. The ramp-spike-soak firing cycle subjects an outer portion thereof to a thermal spike while the inner portion thereof is not subjected to the same thermal spike. This produces a ceramic honeycomb body having average bulk porosity in an outer peripheral portion that is less than average bulk porosity in an inner honeycomb portion. In such embodiments, the green honeycomb body is exposed to a thermal spike, that is, a rapid increase followed by a decrease in temperature. The green honeycomb body is then brought to a soak temperature and maintained at the soak temperature for a predetermined period of time.

In some other embodiments of this disclosure, a ramp-soak-spike firing cycle is used to treat a honeycomb green body. The ramp-soak-spike firing cycle subjects an outer portion thereof to a thermal spike while not subjecting an inner portion to the same thermal spike. This produces a ceramic honeycomb body having average bulk porosity in an outer peripheral portion that is less than average bulk porosity in an inner honeycomb portion. In such embodiments, after the honeycomb body has been maintained at a soak temperature for a predetermined amount of time, it is exposed to a thermal spike, that is, a rapid increase followed by a decrease in temperature.

In further embodiments of this disclosure, a ramp-soak-cool-spike firing cycle is used to treat a honeycomb green body. In the ramp-soak-cool-spike firing cycle, an outer portion thereof is subjected to a thermal spike and an inner portion thereof is not subjected to the same thermal spike. This produces a ceramic honeycomb body having average bulk porosity in an outer peripheral portion that is less than average bulk porosity in an inner honeycomb portion. In such embodiments, after the honeycomb body has been maintained at a soak temperature for a predetermined period of time, it is cooled to a temperature below the soak temperature, and then it is exposed to a thermal spike, that is, a rapid increase followed by a decrease in temperature.

In still further embodiments of this disclosure, a fired-spike-soak firing cycle is used to treat a ceramic honeycomb body. The fired-spike-soak firing subjects an outer portion thereof to a thermal spike and an inner portion thereof is not subjected to the same thermal spike. This produces a ceramic honeycomb body having average bulk porosity in an outer peripheral portion that is less than average bulk porosity in an inner honeycomb portion. In such embodiments, a previously-fired ceramic honeycomb structure is placed in a furnace and the temperature therein is ramped up to a spike temperature. The temperature is then ramped down to a soak temperature and held there for a predetermined period of time, and then cooled to a handling temperature. The predetermined amount of time may be zero in some embodiments.

Numerous other features and aspects are provided in accordance with these and other embodiments of the disclosure. Further features and aspects of embodiments will become more fully apparent from the following detailed description, the claims, and the accompanying drawings.

BRIEF DESCRIPTION OF THE DRAWINGS

The accompanying drawings, described below, are for illustrative purposes and are not necessarily drawn to scale. The drawings are not intended to limit the scope of the disclosure in any way. Like numerals are used throughout the specification and drawings to denote like elements.

DETAILED DESCRIPTION

Figure 1A:
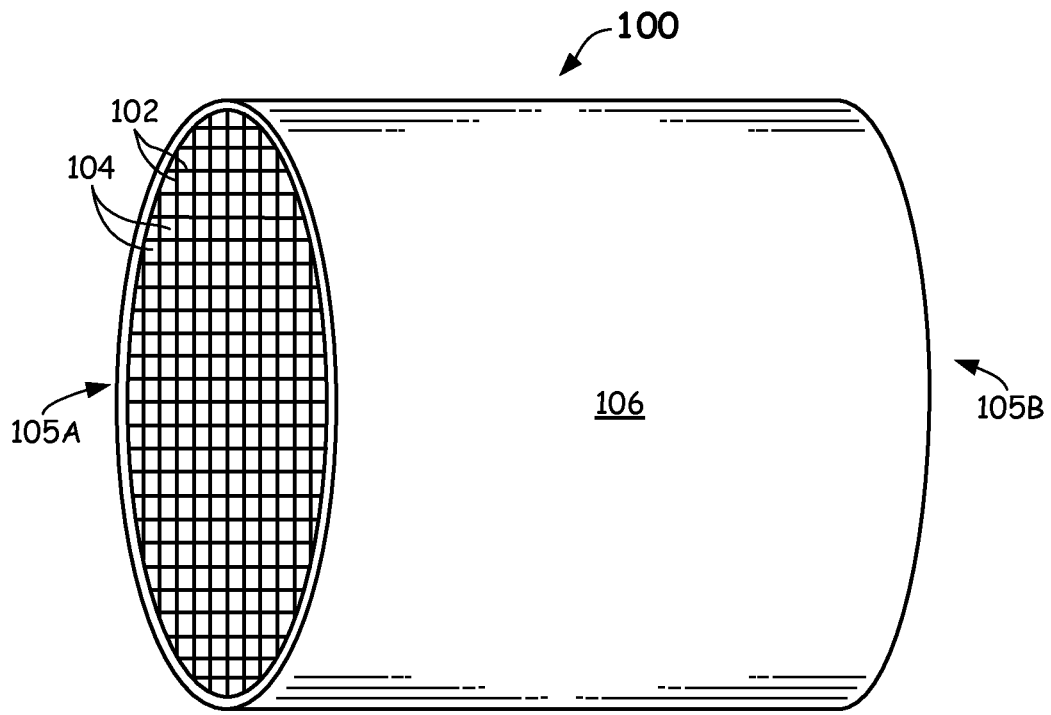
FIG. 1A schematically illustrates a side plan view of an example ceramic honeycomb structure having an outer portion with a first average bulk porosity, and an inner portion with a second average bulk porosity that is greater than the first average bulk porosity in accordance with this disclosure.

Reference will now be made in detail to the example embodiments of this disclosure, which are illustrated in the accompanying drawings. In describing the embodiments, numerous specific details are set forth in order to provide a thorough understanding of the disclosure. However, it will be apparent to a person of skill in the art that embodiments of the disclosure may be practiced without some or all of these specific details. In other instances, well-known features and/or process steps have not been described in detail so as not to obscure embodiments of the disclosure. Features of the various embodiments described herein may be combined with each other, unless specifically noted otherwise.

The materials, components, and assemblies described herein as making up the various embodiments are intended to be illustrative and not restrictive. Many suitable materials and components that can perform the same or a substantially similar function as the materials and components described herein are intended to be embraced within the scope of embodiments of the present disclosure.

Various embodiments in accordance with this disclosure relate to a ceramic honeycomb body suitable for use in the processing of automotive exhaust gases. A ceramic honeycomb body may be configured for use in a catalytic converter, that is, it may be a substrate for deposit of a washcoat of a ceramic material comprising one or more catalyst materials. For example, metals such as platinum, palladium, rhodium, combinations, and the like may be used. These one or more metals catalyze at least one reaction between various components of the exhaust stream, such as of an exhaust stream from an internal combustion engine exhaust (e.g., automotive engine or diesel engine). Other metals may be added such as nickel and manganese to bock sulfur absorption by the washcoat. A common catalytic reaction may reduce oxides of sulfur (SOx). Other catalyzed reactions may comprise the oxidation of carbon monoxide to carbon dioxide, for example. Modern three-way catalytic converters may also reduce oxides of nitrogen (NOx) to nitrogen and oxygen. Additionally, the catalytic converter comprising a ceramic honeycomb body in accordance with this disclosure can facilitate the oxidation of unburnt hydrocarbons to carbon dioxide and water.

Treatment of exhaust gas from internal combustion engines may use catalysts supported on high-surface area substrates that can be ceramic honeycomb bodies and, in the case of diesel engines and some gasoline direct injection engines, a catalyzed or uncatalyzed filter for the removal of particles. Filters and catalyst supports in these applications may be refractory, thermally shock resistant, stable under a wide range of $pO_2$ conditions, non-reactive with the catalyst system, and offer low resistance to exhaust gas flow. Thus, porous ceramic flow-through honeycomb bodies can be used as catalyst substrates and plugged wall-flow honeycomb bodies can be used as wall-flow filters.

A ceramic honeycomb body comprising a honeycomb structure comprises an intersecting matrix of walls of a suitably porous material (e.g., porous ceramic). The catalytic material(s) may be suspended in a washcoat of inorganic particulates and a liquid vehicle, and applied on and/or in the walls of the ceramic honeycomb body, such as by coating. Thereafter, the coated ceramic honeycomb body may be further processed, wrapped with a cushioning material, and received in a can (or housing) via a canning process.

As part of this canning process, the ceramic honeycomb body can be subjected to appreciable isostatic (ISO) compression stresses. In ceramic honeycomb bodies, these ISO stresses can, in some instances, cause fracture of the porous walls thereof. Thus, manufacturing methods that provide ceramic honeycomb bodies, and particularly thin-walled ceramic honeycomb structures, with greater ISO strength may provide certain advantages in terms of less wall fracture during handling, testing, and/or canning. This can result in lowering of scrap.

In accordance with one or more embodiments of this disclosure, a ceramic honeycomb body comprises increased ISO strength. The ISO strength may be increased as much as 10% or more, 15% or more, or 20% or more, as compared to ISO strength of comparable conventionally-manufactured ceramic honeycomb bodies.

Such improved ceramic honeycomb bodies may result in fewer canning fractures from canning pressures and ISO stress to which the ceramic honeycomb bodies are subjected. In one aspect, this may be due to the distribution of porosity in the ceramic honeycomb body wherein an outer peripheral region is configured to have lower average bulk porosity than an interior portion of the ceramic honeycomb body.

A honeycomb body can be formed from a batch mixture, for example, a ceramic-forming batch mixture, comprising ceramic-forming material that may include ceramics or ceramic precursors, or both, an organic binder, and rheology modifiers, a liquid vehicle, an optional pore former, and the like. When dried and fired, the ceramic-forming batch mixture is transformed or sintered into a porous ceramic material, for example, a porous ceramic honeycomb body suitable for exhaust after-treatment purposes. The porous ceramic honeycomb body can comprise any suitable crystalline structure such as cordierite, aluminum titanate, alumina, mullite, feldspar, silicon carbide, silicon nitride, or the like, and combinations thereof.

The honeycomb structure can be initially formed by an extrusion process where the ceramic-forming batch material is extruded from an extrusion die coupled to an extruder to form a green honeycomb body, dried, and then fired to form the ceramic honeycomb body. The extrusion can be performed using a hydraulic ram extrusion press, a two stage de-airing single auger extruder, or a twin-screw extruder with an extrusion die attached to the discharge end. Other suitable forming methods could be used.

Honeycomb extrusion dies employed to produce such honeycomb bodies comprising honeycomb structures can be multi-component assemblies comprising, for example, a wall-forming die body combined with a skin-forming mask. For example, U.S. Pat. Nos. 4,349,329 and 4,298,328 disclose suitable die structures comprising skin-forming masks. Other suitable extrusion dies may be used. The die body may incorporate batch feedholes leading to, and intersecting with, an array of discharge slots formed in the die face, through which the batch mixture is extruded. The extrusion process forms an interconnecting array of intersecting walls forming a central cellular honeycomb structure. A mask can be employed at a skin-forming region of the extrusion die to form an outer peripheral skin. The mask can be a ring-like circumferential structure, such as in the form of a collar, defining the periphery of the skin of the honeycomb structure. The circumferential skin layer of the honeycomb structure can be formed at the same time as the central cellular honeycomb structure by extruding the batch mixture through the extrusion die.

The extruded material, which can be extruded as a log, can be cut to create green honeycomb bodies having suitable shape and size to meet the needs of engine manufacturers. The green honeycomb bodies can alternatively be extruded in the form of honeycomb segments, which can be cut to length, dried (and possibly fired) and bonded together to form the final honeycomb body. These honeycomb segments and resulting honeycomb bodies can be any suitable size or shape.

As clean air regulations become more stringent, ceramic honeycomb bodies for automotive exhaust treatment have correspondingly changed to having relatively thinner walls combined with relatively higher average bulk porosity. However, such ceramic honeycomb bodies with thinner walls and higher average bulk porosity, which may improve their functionality with respect to treating exhaust gases, can also reduce their mechanical strength. This reduction in mechanical strength can reduce the ability of the ceramic honeycomb bodies to withstand isostatic pressure.

In the past, features such as halo (i.e., comprising outer walls adjacent to the skin that are relatively thicker than the interior walls) have been used to increase the strength of ceramic honeycomb bodies. Furthermore, radiusing of the corners of some of the cell channels may also be used to enhance ISO strength. U.S. Pat. No. 6,803,087 to Brew et al., and U.S. Pat. No. 7,597,948 to Miller describe honeycomb bodies with improved isostatic strength, their disclosures being hereby incorporated by reference herein in their entirety for all purposes. In addition, closer control of the distortion of the outer walls can help achieve improved mechanical strength. However, even employing these features, higher porosity honeycomb bodies can have a difficult time withstanding the isostatic pressure required to complete the manufacturing process and/or to perform successfully in an automotive exhaust treatment application without cracking.

It has been found by the inventors that the fractures in such high-porosity honeycomb bodies due to isostatic testing occur at the lowest pressure at locations at or very close to the skin of conventional ceramic honeycomb structures. The inventors have found that by increasing the average isostatic strength of walls at or near the skin of the ceramic honeycomb structures, and possibly also the isostatic strength of the skin, such isostatic-pressure induced cracking may be reduced, or even prevented.

In order to increase the isostatic strength of a ceramic honeycomb structure, the skin, and walls adjacent to or near the skin, may be strengthened by reducing the relative average bulk porosity in those areas. Various embodiments in accordance with this disclosure may comprise average bulk porosity throughout an interior portion of the ceramic honeycomb body, but close to the skin and adjacent to the skin, the porosity may be less than the average bulk porosity of the interior portion. For example, the average bulk porosity close to and adjacent to the skin, or of the skin, can comprise less than that of an interior portion by about 1%. In other embodiments, ceramic honeycomb bodies can comprise average bulk porosity of the wall close to or at the skin or of the skin that is less than an average bulk porosity of the interior portion by about 3%. In still further embodiments ceramic honeycomb bodies can comprise an average bulk porosity of the wall close to or at the skin less than an interior portion of the ceramic honeycomb structure by up to about 5%. And, in some embodiments, higher reductions (e.g., porosity of the skin less than that of the interior portion by greater than 5%) are not desired or needed and should be avoided due to thermal shock performance restrictions. Thus, average bulk porosity close to and adjacent to the skin, or of the skin, can be less than that of an interior portion ranging from 1% to 5%. Average bulk porosity as used herein means the average porosity of various bulk regions measured by mercury porosimetry.

Figure 1B:
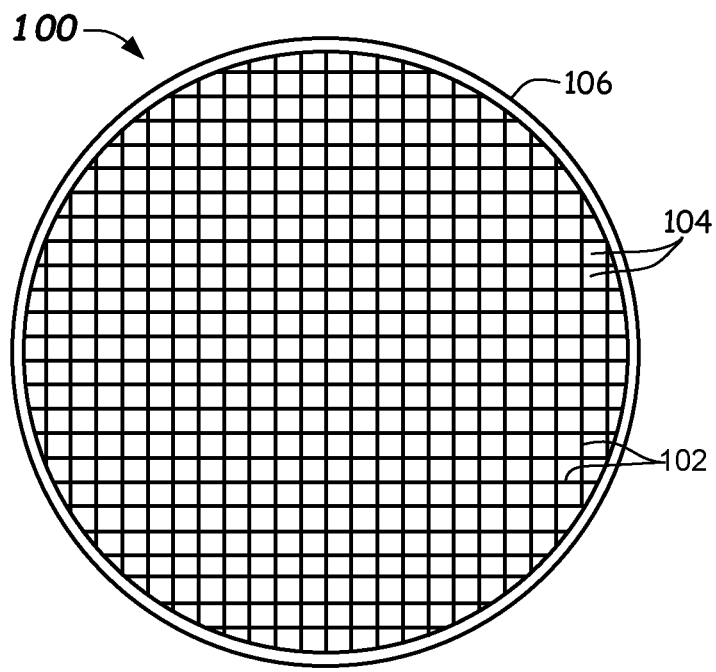
FIG. 1B schematically illustrates an end view an example ceramic honeycomb structure with an outer portion with a first average bulk porosity, and an inner portion with a second average bulk porosity that is greater than the first average bulk porosity in accordance with this disclosure.

FIGS. 1A and 1B illustrate an example ceramic honeycomb body 100 in accordance with some embodiments of this disclosure. Ceramic honeycomb body 100 comprises a honeycomb structure comprising a matrix made of a plurality of intersecting walls 102 that provide channels 104, which extend longitudinally from a first end 105A to a second end 105B. Channels 104 may be formed of intersecting walls 102 (orthogonally intersecting as shown) in some embodiments. A skin 106 can be disposed on an outer peripheral region of the matrix of intersecting walls 102. A rectangular (e.g., square) cross-sectional channel shape in transverse cross-section is shown. However other cross-sectional channel shapes in transverse cross-section may be used, such as rectangular (non-square), hexagonal, octagonal, triangular, diamond, and combinations thereof.

Figure 1C:
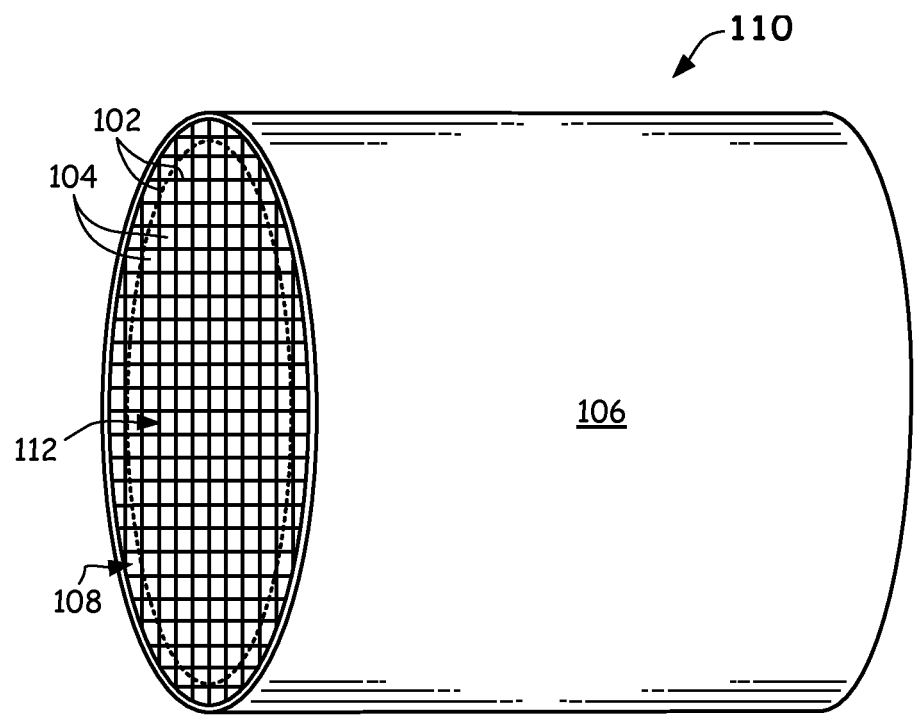
FIG. 1C schematically illustrates a side view an example ceramic honeycomb structure with an outer portion with a first average bulk porosity, an inner portion with a second average bulk porosity that is greater than the first average bulk porosity, and a halo portion disposed between the outer portion and the inner portion, in accordance with this disclosure.
Figure 1D:
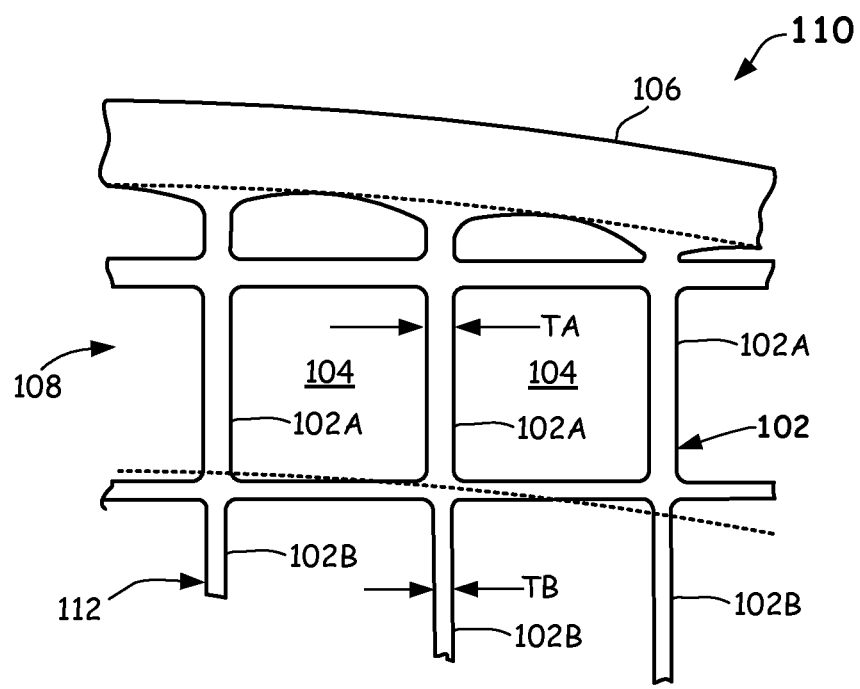
FIG. 1D schematically illustrates a partial end view an example ceramic honeycomb structure with a halo portion with a first average bulk porosity and an inner portion with a second average bulk porosity that is greater than the first average bulk porosity in accordance with this disclosure.
Figure 1E:
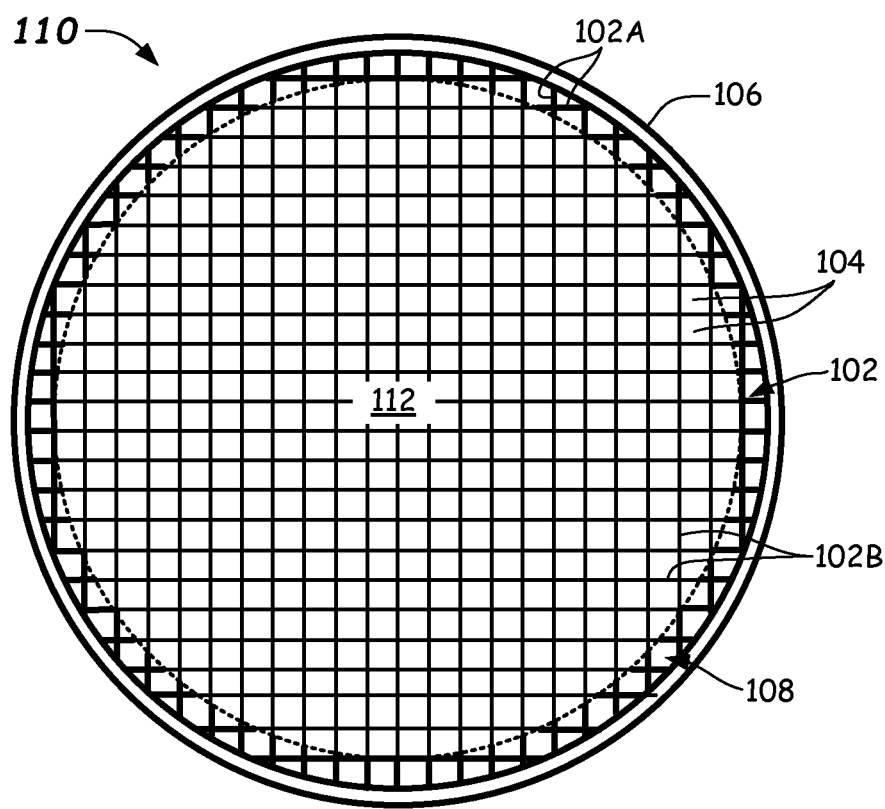
FIG. 1E schematically illustrates an end view of an example ceramic honeycomb structure with an outer portion with a first average bulk porosity, an inner portion with a second average bulk porosity that is greater than the first average bulk porosity, and a halo portion disposed between the outer portion and the inner portion, in accordance with this disclosure.

FIGS. 1C through 1E illustrate an example ceramic honeycomb body 110 in accordance with some embodiments of this disclosure. Ceramic honeycomb body 110 is similar to ceramic honeycomb body 100 in that it comprises a honeycomb structure comprising a matrix made of a plurality of intersecting walls 102 (e.g., orthogonally-intersecting walls), that provide channels 104 extending along the longitudinal length of the honeycomb body 100, and a skin 106 that is disposed on an outer peripheral region of the intersecting walls 102. Ceramic honeycomb body 110 further includes a halo region 108 disposed between skin 106 and an interior portion 112 of the matrix. The halo region 108 can be a ring-shaped region of thick walls 102A that are thicker in transverse thickness than thin walls 102B in interior portions 112 of the matrix that are disposed inwardly from halo region 108. As shown in FIG. 1D, thick walls 102A may be between 5% and 50% thicker in transverse thickness TA than the transverse thickness TB of the thin walls 102B. The halo region 108 disposed between skin 106 and the interior portion 112 can extend inwardly a few cells (e.g., 1-3 cells).

Although example ceramic honeycomb bodies 100, 110 are shown as cylindrical structures, alternative embodiments of this disclosure may be implemented with any other suitable cross-sectional outer shapes, such as oval, racetrack, square, rectangular (non-square), octagonal, pie-shaped, triangular or tri-lobed, and the like.

As discussed above, a reduction in the average bulk porosity at and/or near the skin 106 of a ceramic honeycomb body 100, 110 can significantly increase the strength in the skin area. Moreover, an increase in strength imparted by the reduction in average bulk porosity at and/or near the skin increases the pressure that the ceramic honeycomb body can withstand. Correspondingly, this increase in strength can increase the pressure at which the ceramic honeycomb body can crack under isostatic pressure. By increasing the pressure at which the ceramic honeycomb body breaks, in one advantage, honeycomb body manufacturing yields can be increased.

In various embodiments in accordance with this disclosure, the increased strength of the ceramic honeycomb body 100, 110 can be achieved by utilizing firing cycles for firing the green honeycomb bodies that comprise a "thermal spike" (i.e., a spike in temperature). It is noted that a small increase in the yearly operating cost of an additional high-temperature process step, such as but not limited to, temperature spiking, may be less than the cost of even one production lot of ceramic honeycomb bodies of conventional construction lost to isostatic pressure testing. These advantages provided by the firing cycles disclosed herein apply to a variety of ceramic honeycomb bodies including, but not limited to, aluminum titanate ceramic honeycomb structures, cordierite ceramic honeycomb structures, cordierite-titania containing structures, and the like as mentioned herein.

Additional potential benefits of the lowered average bulk porosity of the skin comprise preventing bleed through of coatings, better chip resistance for the ceramic honeycomb bodies, better handling response, and more efficient use of coating material (i.e., less coating going to the walls adjacent to or near the skin 106 where they can have minimal impact on performance).

In various embodiments, a green honeycomb body comprising a honeycomb structure comprising intersecting walls 102 and a skin 106 disposed around the periphery of the matrix, may be loaded into a furnace. No special furnace designs are needed to implement various embodiments in accordance with this disclosure. It is noted that in one or more alternative embodiments, a firing cycle in accordance with this disclosure may also be applied to a previously-fired ceramic honeycomb structure.

In various embodiments, the oxygen level in the furnace may be controlled, or varied, by introducing nitrogen and/or recycled products of combustion into the furnace. Further, oxygen level and temperature in the furnace may be controlled or varied such that crack-free ware is produced. Various embodiments in accordance with this disclosure may be implemented with ambient pressure. Various embodiments may be implemented without the addition of steam into the furnace. It is further noted that the recycled products of combustion, mentioned above, may contain steam.

First Example Firing Cycle

In some embodiments, methods of producing a ceramic honeycomb body suitable for use in automotive exhaust after treatment include extruding a green honeycomb body comprising a honeycomb structure comprising a matrix of intersecting walls, and a skin disposed on the outer periphery of the matrix, and firing the extruded green honeycomb body. The green honeycomb body is then dried and fired such that a thermal spike occurs during the firing cycle. As used herein, "thermal spike" refers to rapidly raising (in a heating phase) the temperature that the honeycomb body is exposed to, to a spike temperature (at the spike's peak) above a soak temperature of the firing cycle, and then rapidly reducing the temperature from the spike temperature (cooling phase). The expression "rapidly raising," as used herein, with regards to the heating phase of the thermal spike, means heating at a heating rate of greater than 50° C./hour, or greater than 100° C./hour, or even greater than 150° C./hour. The expression "rapidly reducing," as used herein, with regards to the cooling phase of the thermal spike, means a cooling rate of greater than 50° C./hour, or greater than 120° C./hour, or even greater than 200° C./hour.

In some embodiments, after placing the green honeycomb body in a furnace for its first firing, the green honeycomb body may be treated with a firing cycle that comprises ramping up the temperature in the furnace to reach a first temperature, thermally spiking, i.e., ramping up, the temperature in the furnace to a spike temperature above a soak temperature, and ramping down the temperature in the furnace to the soak temperature, and, after maintaining the soak temperature for a predetermined period of time, ramping down (cool down cycle) the temperature in the furnace to a handling temperature (e.g., less than about 400° C.). Such a firing cycle may be referred to as a "ramp-spike-soak" firing cycle. The ramp-spike-soak firing cycle provides a ceramic honeycomb body 100, 110 having a reduced average bulk porosity in the outer periphery thereof, e.g., of the skin 106, of the walls 102 adjacent to the skin 106, and/or of the halo region 108 of the matrix, as compared to the average bulk porosity of the interior portion 112 of the matrix. An illustrative example of a ramp-spike-soak firing cycle is shown in Table 1 and FIG. 6 herein.

TABLE 1

| First Example Ramp-Spike-Soak Firing Cycle | |
|---|---|
| Ware | Green Honeycomb Body |
| Step 1 | ramp to 1,000° C. such that the ware remains crack-free |
| Step 2 | ramp to 1,420° C. at 100° C./h or more (ramp to spike) |
| Step 3 | ramp down to 1,350° C. at 150° C./h |
| Step 4 | hold at 1,350° C. for 22 h |
| Step 5 | Ramp down to 20° C. at 150° C./h |

These illustrative embodiments of the ramp-spike-soak firing cycle provide examples, but not limitations on firing cycles in accordance with this disclosure. In some embodiments, the first temperature comprises 1,000° C. or greater but not greater than 200° C. less than the spike temperature, and the spike temperature can comprise greater than about 1,200° C., or at least 15° C. greater than the soak temperature, or even 40° C. greater than the soak temperature, or even 100° C. greater than the soak temperature, or about 1,420° C.±5% in some embodiments. The soak temperature can comprise a range from 1,350° C. to 1,450° C., and the predetermined period of time during which the furnace is maintained at the soak temperature can comprise from 4 hours to 24 hours. The soak temperature as well as the period of time for which the soak temperature is maintained may be dependent on the specific material composition of the ceramic honeycomb structure being fired, and on the specific microstructural properties of the honeycomb structures that are intended to be produced by the firing cycle. In some embodiments, the handling temperature may be less than about 400° C.

In some embodiments of the ramp-spike-soak firing cycle, ramping up to the spike temperature may be performed at about 100° C./hour or greater, ramping down from the spike temperature to the soak temperature may be done at about 150° C./hour, and ramping down from the soak temperature to the handling temperature may be done at about 150° C./hour.

Various embodiments in accordance with this disclosure may be implemented without hold times when transitioning between the temperatures listed above, and/or transitioning between ramp rates. It is further noted that various embodiments may change the oxygen level in the furnace without having to change the temperature ramp rates listed above.

Figure 2:
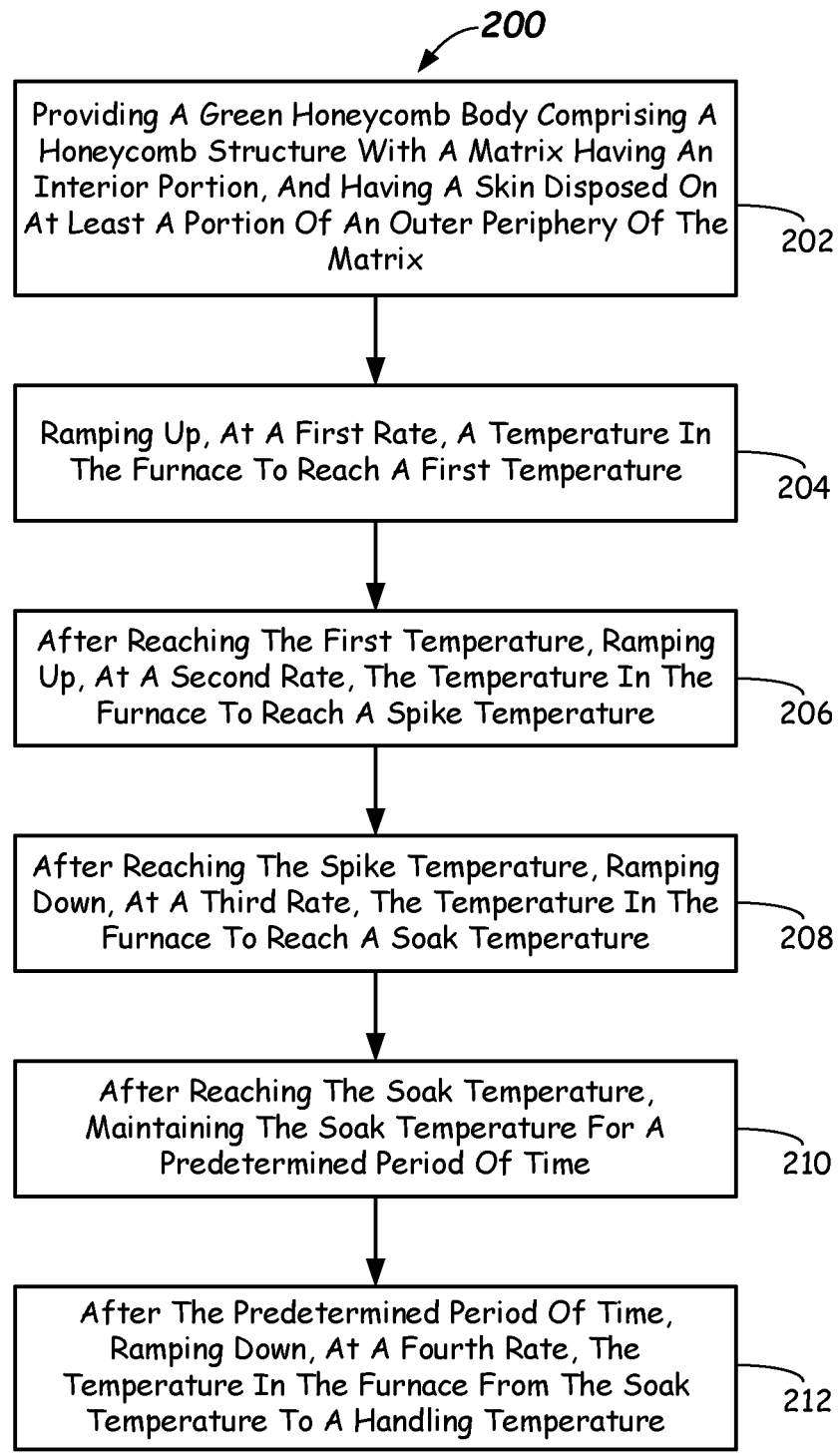
FIG. 2 illustrates a flow diagram of an example ramp-spike-soak method of producing a ceramic honeycomb structure with an outer portion with a first average bulk porosity, and an inner portion with a second average bulk porosity that is greater than the first average bulk porosity in accordance with this disclosure.

Referring now to FIG. 2, an example method of manufacturing a ceramic honeycomb body 100, 110 having a lower average bulk porosity at an outer peripheral portion than in an interior portion thereof with a ramp-spike-soak firing cycle in accordance with this disclosure is illustrated.

In some embodiments, a method 200 of manufacturing a ceramic honeycomb body comprises providing, in 202, a green honeycomb structure. After firing, the honeycomb body is suitable for use in automotive exhaust after treatment. The green honeycomb body comprising a honeycomb structure with a matrix having an interior portion (e.g., interior portion 112), and having a skin (e.g., skin 106) disposed on at least a portion of an outer periphery of the matrix. Method 200 further includes, in 204, ramping up, at a first rate, a temperature in the furnace to reach a first temperature. The term "furnace" as used herein means any furnace, kiln (including a tunnel kiln), or heating apparatus that can carry out the firing cycles described herein. In 206, after reaching the first temperature, the firing cycle comprises ramping up, at a second rate, the temperature in the furnace to reach a spike temperature. In 208, after reaching the spike temperature, the method 200 comprises ramping down, at a third rate, the temperature in the furnace to reach a soak temperature. In 210, after reaching the soak temperature, the method 200 comprises maintaining the soak temperature for a predetermined period of time. In 212, after the predetermined period of time, the method 200 comprises ramping down, at a fourth rate, the temperature in the furnace from the soak temperature to a handling temperature. The firing cycle of method 200, in accordance with this disclosure, provides a ceramic honeycomb body 100, 110 comprising an interior portion of the matrix of intersecting walls with a first average bulk porosity, and the skin (as well as a region closely adjacent to the skin) with a second average bulk porosity that is less than the first average bulk porosity.

Second Example Firing Cycle

In some embodiments, methods of manufacturing a ceramic honeycomb structure suitable for use in automotive exhaust gas processing comprises extruding a green honeycomb body comprising a honeycomb structure with a matrix of intersecting walls 102, and a skin 106 disposed on the outer periphery of the matrix. The green honeycomb body is then dried and fired such that a thermal spike occurs during the firing cycle. In some embodiments, after placing the green honeycomb body in the furnace, the green honeycomb body can be treated with a firing cycle that comprises ramping up the temperature in the furnace to a soak temperature, maintaining the soak temperature for a predetermined period of time, and ramping up the temperature in the furnace to a spike temperature that is higher than the soak temperature. An illustrative example of a "ramp-soak-spike" firing cycle is shown in Table 2 and FIG. 7 herein.

TABLE 2

Second Example: Ramp-Soak-Spike Firing Cycle

| Ware | Green Honeycomb Body |
|---|---|
| Step 1 | ramp to 220° C. at 200° C./h |
| Step 2 | ramp to 225° C. at 50° C./h |
| Step 3 | ramp to 250° C. at 5° C./h |
| Step 4 | ramp to 270° C. at 5° C./h |
| Step 5 | ramp to 800° C. at 200° C./h |
| Step 6 | ramp to 1,000° C. at 6.8° C./h |
| Step 7 | ramp to 1,350° C. at 75° C./h |
| Step 8 | hold at 1,350° C. for 22 h |
| Step 9 | ramp to 1,420° C. at 100° C./h |
| Step 10 | ramp down to 20° C. at 150° C./h |

In some embodiments of the ramp-soak-spike firing cycle, the spike temperature can comprise about 1,420° C.±5%, the soak temperature may comprise about 1,350° C.±5%, and the predetermined period of time during which the furnace is maintained at the soak temperature may be in the range from about 4 hours to about 24 hours. The soak temperature as well as the period of time for which the soak temperature is maintained may be dependent on the specific material composition of the honeycomb body being fired, and on the specific microstructure properties of the honeycomb body that are intended to be produced by the firing cycle. In some embodiments, the handling temperature may be below about 400° C. In some embodiments of the ramp-soak-spike firing cycle, ramping up to the spike temperature may be done at about 100° C./hour or greater, ramping down from the spike temperature to the soak temperature may be done at about 150° C./hour or even more negative, and ramping down from the soak temperature to the handling temperature may also be done at about 150° C./hour or even more negative.

Referring to Table 2 above, it can be seen that, in this example ramp-soak-spike firing cycle, the furnace temperature is ramped up at non-linear, or piecewise-linear, rates. For example, ramping up to 220° C. at 200° C./hour, followed by ramping up to 225° C. at 50° C./hour, followed by ramping up to 250° C. at 5° C./hour, followed by ramping up to 270° C. at 5° C./hour, followed by ramping up to 800° C. at 200° C./hour, followed by ramping up to 1,000° C. or more at 6.8° C./hour. The temperatures and rates set forth in this paragraph are nominal. Various embodiments in accordance with this disclosure may be implemented without hold times when transitioning between the temperatures listed above, and/or transitioning between ramp rates. It is further noted that various embodiments may change the oxygen level in the furnace without having to change the temperature ramp rates listed above.

Figure 3:
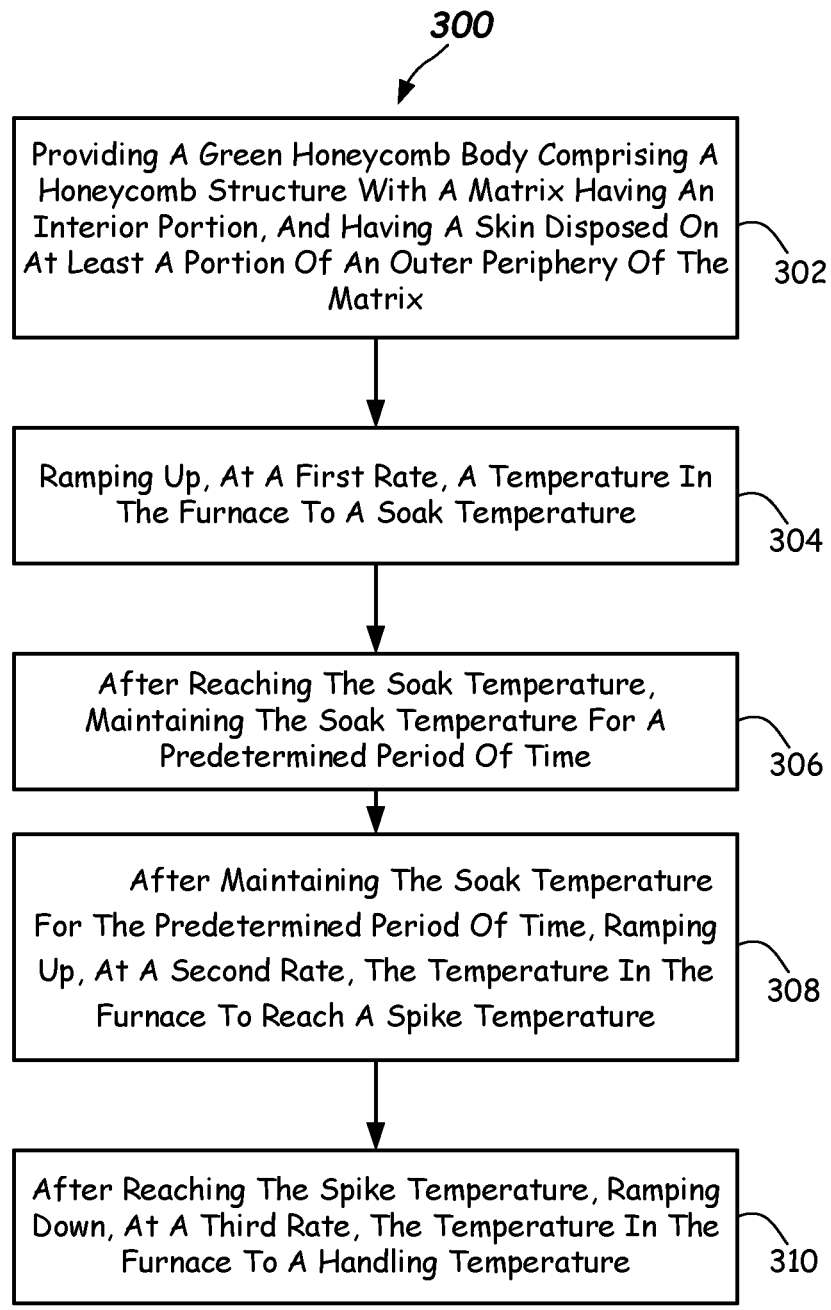
FIG. 3 illustrates a flow diagram of an example ramp-soak-spike method of producing a ceramic honeycomb structure with an outer portion with a first average bulk porosity, and an inner portion with a second average bulk porosity that is greater than the first average bulk porosity in accordance with this disclosure.

Referring now to FIG. 3, an example method of manufacturing a ceramic honeycomb body with lower average bulk porosity at an outer peripheral portion than in an interior portion thereof with a ramp-soak-spike firing cycle in accordance with this disclosure is illustrated.

In some embodiments, a method 300 of manufacturing a ceramic honeycomb body comprises, in 302, providing a green honeycomb body that, after firing, can be suitable for use in automotive exhaust after treatment. The green honeycomb body is configured to comprise a honeycomb structure comprising a matrix of intersecting walls (e.g., walls 102) having an interior portion (e.g., interior portion 112), and having a skin (e.g., skin 106) disposed on at least a portion of an outer periphery of the matrix. Method 300 further includes, in 304, ramping up, at a first rate, a temperature in the furnace to a soak temperature. The soak temperature may depend on the specific composition used in the batch mixture. In 306, after reaching the soak temperature, the soak temperature is maintained for a predetermined period of time. For example, the predetermined period of time may range from about 4 hours to about 24 hours. In 308, after maintaining the soak temperature for the predetermined period of time, the method 300 comprises ramping up, at a second rate, the temperature in the furnace to reach a spike temperature. After reaching the spike temperature, the method includes, in 310, ramping down, at a third rate, the temperature in the furnace to a handling temperature. The ramp-soak-spike firing cycle of method 300, in accordance with this disclosure, provides a ceramic honeycomb structure 100, 110 having an interior portion 112 of the matrix with a first average bulk porosity, and the skin 106 with a second average bulk porosity that is less than the first average bulk porosity. Moreover, the ramp-soak-spike firing cycle of method 300, in accordance with this disclosure, provides a ceramic honeycomb structure 100, 110 with an outer region of walls of the matrix adjacent to the skin 106 having an average bulk porosity less than the first average bulk porosity of the interior portion (e.g., interior portion 112) of the matrix.

Third Example Firing Cycle

In some embodiments, methods of manufacturing a ceramic honeycomb body that can be suitable for use in automotive exhaust after treatment are provided. The method 400 includes extruding a green honeycomb body comprising a honeycomb structure with a matrix of intersecting walls (e.g., walls 102), and a skin (e.g., skin 106) disposed on the outer periphery of the matrix. The green honeycomb body is then dried and fired such that a thermal spike occurs during the firing. In some embodiments, after placing the green honeycomb body in a furnace, the green honeycomb structure is treated with a firing cycle that includes ramping up the temperature in the furnace towards a soak temperature, maintaining the soak temperature for a predetermined period of time, ramping down the temperature to a temperature below the soak temperature to reach a pre-spike temperature, ramping up, i.e., spiking, the temperature in the furnace above the soak temperature to reach the spike temperature, and ramping down the temperature in the furnace to a handling temperature. In some embodiments, the handling temperature is less than 400° C. Such a firing cycle may be referred to as a "ramp-soak-cool-spike" firing cycle. The ramp-soak-cool-spike firing cycle provides a ceramic honeycomb body 100, 110 with a reduced average bulk porosity in the outer periphery thereof (e.g., in the skin 106, in the walls 102 adjacent to the skin 106, and/or in the halo region 108 of the matrix), as compared to the average bulk porosity of the interior portion 112 of the matrix. An illustrative example of a ramp-soak-cool-spike firing cycle is shown in Table 3 and FIG. 8.

TABLE 3

Third Example: Ramp-Soak-Cool-Spike Firing Cycle

| Ware | Green Honeycomb Body |
| --- | --- |
| Step 1 | ramp to 220° C. at 200° C./h |
| Step 2 | ramp to 225° C. at 50° C./h |
| Step 3 | ramp to 250° C. at 5° C./h |
| Step 4 | ramp to 270° C. at 5° C./h |

TABLE 3-continued

Third Example: Ramp-Soak-Cool-Spike Firing Cycle

| Ware | Green Honeycomb Body |
| --- | --- |
| Step 5 | ramp to 800° C. at 200° C./h |
| Step 6 | ramp to 1,000° C. at 6.8° C./h |
| Step 7 | ramp to 1,350° C. at 75° C./h |
| Step 8 | hold at 1,350° C. for 22 h |
| Step 9 | ramp down to 1,200° C. at 150° C./h |
| Step 10 | ramp to 1,420° C. at 100° C./h |
| Step 11 | ramp down to 20° C. at 150° C./h |

In some embodiments of the ramp-soak-cool-spike firing cycle, the spike temperature may be about 1,420° C.±5%, the soak temperature may be 1,350° C.±5%, and the predetermined period of time during which the furnace is maintained at the soak temperature may range from about 4 hours to about 24 hours. In some embodiments, the handling temperature may be less than 400° C.

In some embodiments of the ramp-soak-cool-spike firing cycle, ramping down to the pre-spike temperature from the soak temperature may be done at about 150° C./hour or more negative, ramping up to the spike temperature from the pre-spike temperature may be done at about 100° C./hour or greater, and ramping down from the spike temperature to the handling temperature may be done at about 150° C./hour or more negative.

Referring to Table 3 above, it can be seen in this example firing cycle that the furnace temperature is ramped up at non-linear, or piecewise-linear, rates. For example, ramping up to 220° C. at 200° C./hour, followed by ramping up to 225° C. at 50° C./hour, followed by ramping up to 250° C. at 5° C./hour, followed by ramping up to 270° C. at 5° C./hour, followed by ramping up to 800° C. at 200° C./hour, followed by ramping up to 1,000° C. or more at 6.8° C./hour. The temperatures and rates set forth in this paragraph are nominal. Various embodiments in accordance with this disclosure may be implemented without hold times when transitioning between the temperatures listed above, and/or transitioning between ramp rates. It is further noted that various embodiments may change the oxygen level in the furnace without having to change the temperature ramp rates listed above.

Figure 4:
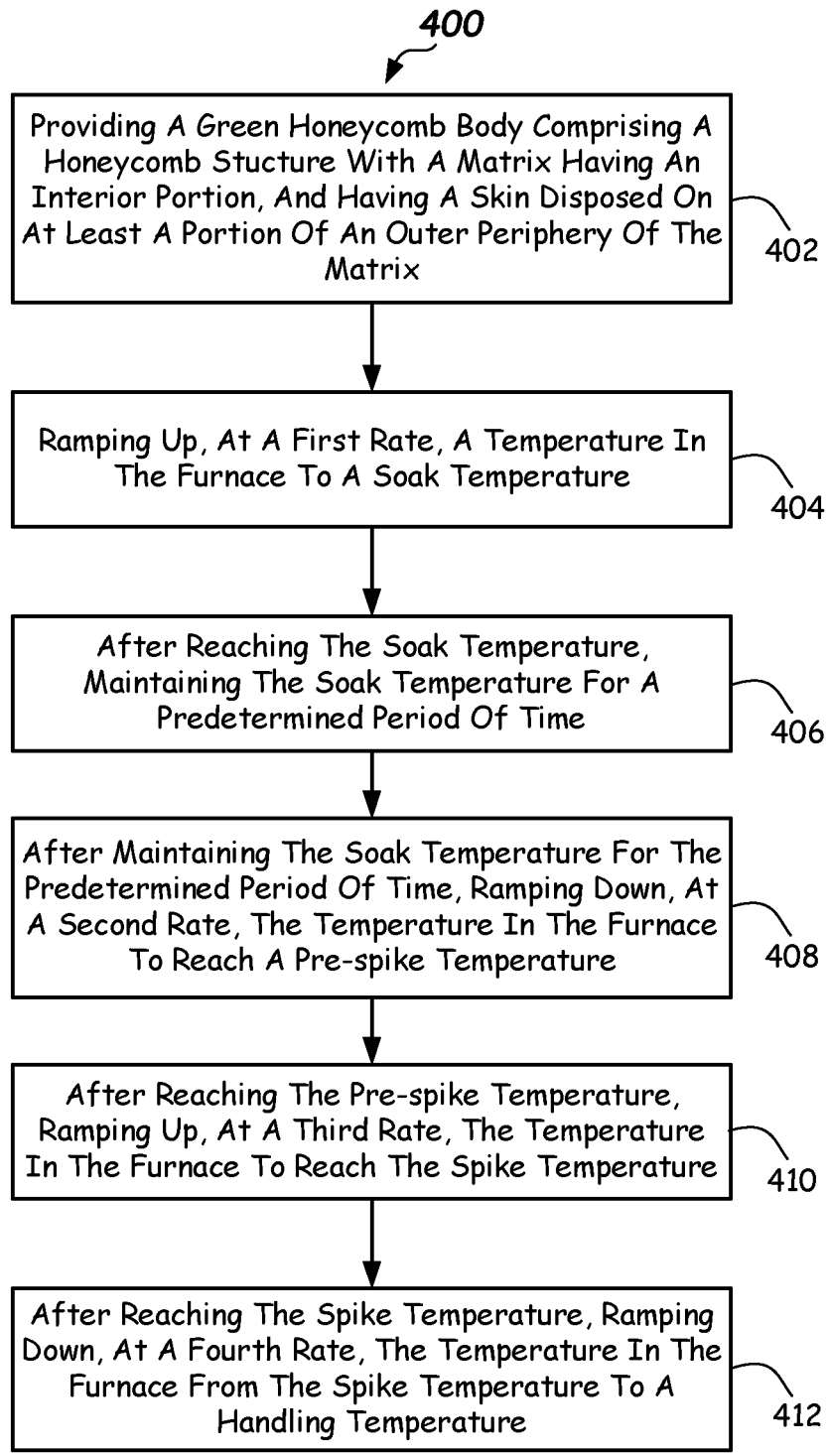
FIG. 4 illustrates a flow diagram of an example ramp-soak-cool-spike method of producing a ceramic honeycomb structure with an outer portion with a first average bulk porosity, and an inner portion with a second average bulk porosity that is greater than the first average bulk porosity in accordance with this disclosure.

FIG. 4 illustrates a flow diagram of an example method 400 for manufacturing a ceramic honeycomb structure with lower porosity at an outer peripheral portion than in an inner portion thereof using a ramp-soak-cool-spike firing cycle in accordance with this disclosure.

In some embodiments, a method 400 for manufacturing a ceramic honeycomb structure includes, in 402, providing a green honeycomb structure that, after firing, can be suitable for use in automotive exhaust after treatment. The green honeycomb body comprises a honeycomb structure with a matrix having an interior portion (e.g., interior portion 112), and having a skin (e.g., skin 106) disposed on at least a portion of an outer periphery of the matrix. Method 400 further comprises, in 404, ramping up, at a first rate, a temperature in the furnace to a soak temperature. After reaching the soak temperature, the method 400 comprises, in 406, maintaining the soak temperature for a predetermined period of time. After maintaining the soak temperature for the predetermined period of time, the method 400 includes, in 408, ramping down, at a second rate, the temperature in the furnace to reach a pre-spike temperature. The pre-spike temperature can comprise a temperature at least 150° C. below the soak temperature, for example, and can be between about 1,100° C. and about 1,300° C. After reaching the pre-spike temperature, the method 400 comprises, in 410 ramping up, at a third rate, the temperature in the furnace to reach the spike temperature, and after reaching the spike temperature, ramping down in 412, at a fourth rate, the temperature in the furnace from the spike temperature to a handling temperature. The firing cycle of method 400, in accordance with this disclosure, provides a ceramic honeycomb body 100, 110 having a reduced average bulk porosity in the outer periphery thereof, e.g., the skin 106, walls 102 adjacent to the skin, and/or a halo region 108 of the matrix, as compared to the average bulk porosity of the interior portion of the matrix.

Fourth Example Firing Cycle

In some embodiments, methods of manufacturing a ceramic honeycomb body that can be suitable for use in automotive exhaust after treatment are provided. The methods comprise extruding a green honeycomb body comprising a honeycomb structure with a matrix of intersecting walls 102, and a skin 106 disposed on the outer periphery of the matrix, and firing the green honeycomb body such that a thermal spike does not occur during the firing to produce a first-fired ceramic honeycomb structure. This first-fired ceramic honeycomb body is then subjected to a second firing cycle in accordance with this disclosure that comprises a thermal spike.

In some embodiments, after placing the previously-fired ceramic honeycomb body in a furnace, the previously-fired ceramic honeycomb body is treated with a firing cycle that comprises spiking the temperature in the furnace to a temperature in a predetermined range that is greater than a soak temperature. After reaching the spike temperature, ramping down the temperature in the furnace to the soak temperature, maintaining the soak temperature for a predetermined period of time, and ramping down the temperature in the furnace to a handling temperature. In some embodiments the handling temperature is less than 400° C. Such a firing cycle may be referred to as a "fired-spike-soak" firing cycle. The fired-spike-soak firing cycle provides a ceramic honeycomb body 100, 110 having a reduced average bulk porosity in the outer periphery thereof, e.g., the skin 106, walls 102 adjacent to the skin, and/or a halo region 108 of the matrix, as compared to the average bulk porosity of the interior portion of the matrix. An illustrative example of a fired-spike-soak firing cycle is shown in Table 4 and FIG. 9.

TABLE 4

Fourth Example: Fired-Spike-Soak Firing Cycle

| Ware | Fired Ceramic Honeycomb Body |
|---|---|
| Step 1 | ramp to 1,420° C. at 100° C./h |
| Step 2 | ramp down to 1,350° C. at 150° C./h |
| Step 3 | hold at 1,350° C. for 22 h |
| Step 4 | ramp down to 20° C. at 150° C./h |

In some embodiments of the fired-spike-soak firing cycle, the spike temperature can comprise greater than about 1,350° C., or about 1,420° C.±5%, for example. The soak temperature may be about 1,350° C.±5%, and the predetermined period of time during which the furnace is maintained at the soak temperature may be less than 4 hours. In some embodiments, the handling temperature may be between less than about 400° C.

In some embodiments of the fired-spike-soak firing cycle, ramping up (heating) to the spike temperature may be performed at a ramp rate of about 100° C./hour or greater, ramping down (cooling) from the spike temperature to the soak temperature may be performed at ramp rate of about 150° C./hour or more negative, and ramping down (cooling) from the soak temperature to the handling temperature may be performed at about 150° C./hour or more negative.

Figure 5:
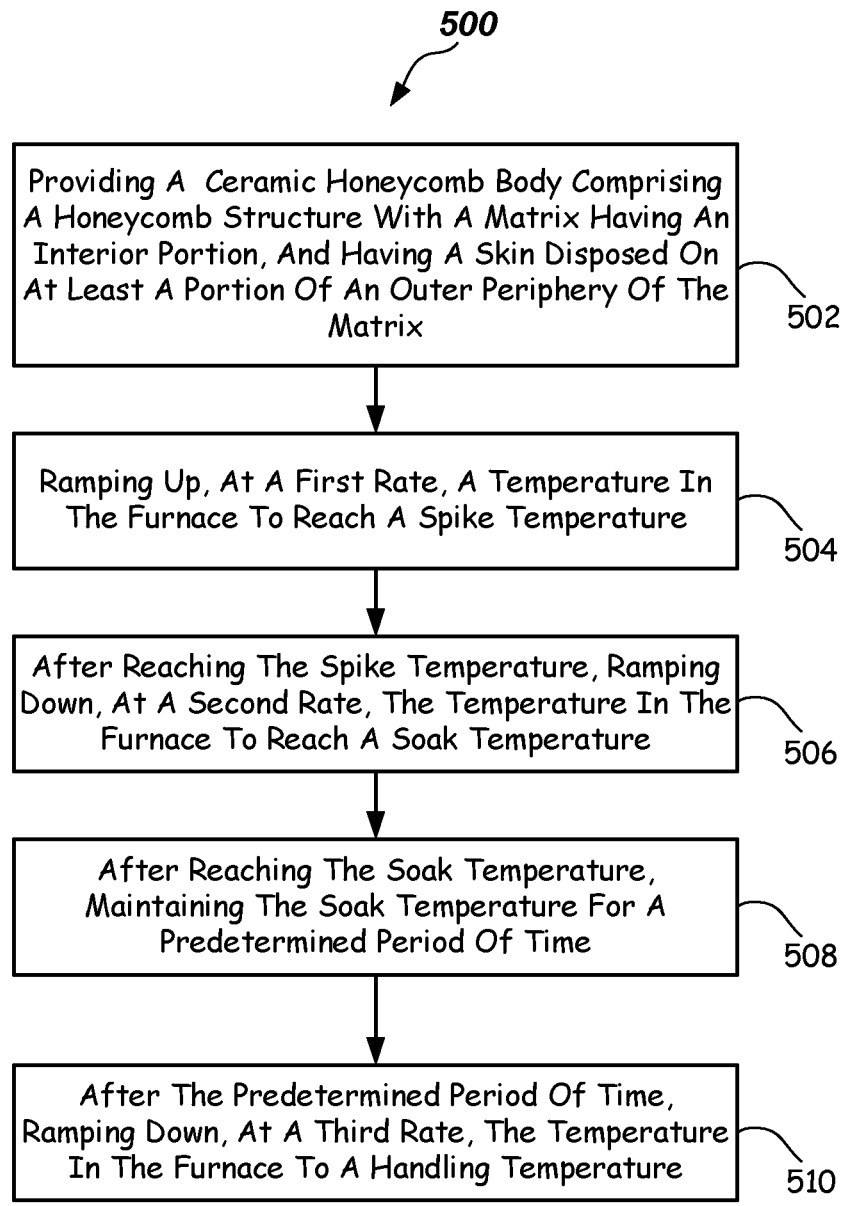
FIG. 5 illustrates a flow diagram of an example fired-spike-soak method of producing a ceramic honeycomb structure with an outer portion with a first average bulk porosity, and an inner portion with a second average bulk porosity that is greater than the first average bulk porosity in accordance with this disclosure.

FIG. 5 illustrates a flow diagram of an example method 500 for manufacturing a ceramic honeycomb structure 100, 110 with lower average bulk porosity at an outer peripheral portion than in an inner portion thereof with a fired-spike-soak firing cycle in accordance with this disclosure.

In some embodiments, method 500 for manufacturing a ceramic honeycomb body comprises, in 502, providing a ceramic honeycomb body (e.g., that has been previously fired). The ceramic honeycomb body can be suitable for use in automotive exhaust after treatment. The ceramic honeycomb body comprises a honeycomb structure with a matrix of intersecting walls 102 having an interior portion 112, and having a skin 106 disposed on at least a portion of an outer periphery of the matrix. Method 500 further comprises firing the ceramic honeycomb body in a furnace where the firing comprises, in 504, ramping up, at a first rate, a temperature in the furnace to reach a spike temperature. After reaching the spike temperature, the method comprises, in 506, ramping down, at a second rate, the temperature in the furnace to reach a soak temperature, and, in 508, after reaching the soak temperature, maintaining the soak temperature for a predetermined period of time. After the predetermined period of time, method 500 comprises, in 510, ramping down, at a third rate, the temperature in the furnace to a handling temperature. The firing cycle of method 500, in accordance with this disclosure, provides a ceramic honeycomb body 100, 110 having a reduced average bulk porosity in the outer periphery thereof, e.g., the skin 106, walls 102 adjacent to the skin, and/or a halo region 108 of the matrix, as compared to the average bulk porosity of the interior portion of the matrix.

In one embodiment, the average bulk porosities of the inner portion 112 may range between about 59% to about 60%, and skin 106 may range between about 52% to about 58%. In some embodiments, the average bulk porosity may vary approximately linearly from the physical center of the honeycomb structure 100, 110 to the outer periphery thereof at the skin 106. In some embodiments, the average bulk porosity of the skin 106 is less that an average bulk porosity of the interior portion 112 by 2% or more, 3% or more, 4% or more, or even up to 5%, for example. In some embodiments, the average bulk porosity of the walls 102 adjacent to the skin 106 is less than an average bulk porosity of the interior portion 112 by these same amounts. The following Table 5 provides examples of porosities achieved.

TABLE 5

Example porosities

| Example # | Avg. P % Skin | Avg. P % Interior | Avg. P % Walls Adj. Skin | Diff. P % Interior to Skin |
|---|---|---|---|---|
| 1 | 57.5 | 59.5 | 58.2 | 3.4% |
| 2 | 56.7 | 58.9 | 58.4 | 2.9% |

Figure 6:
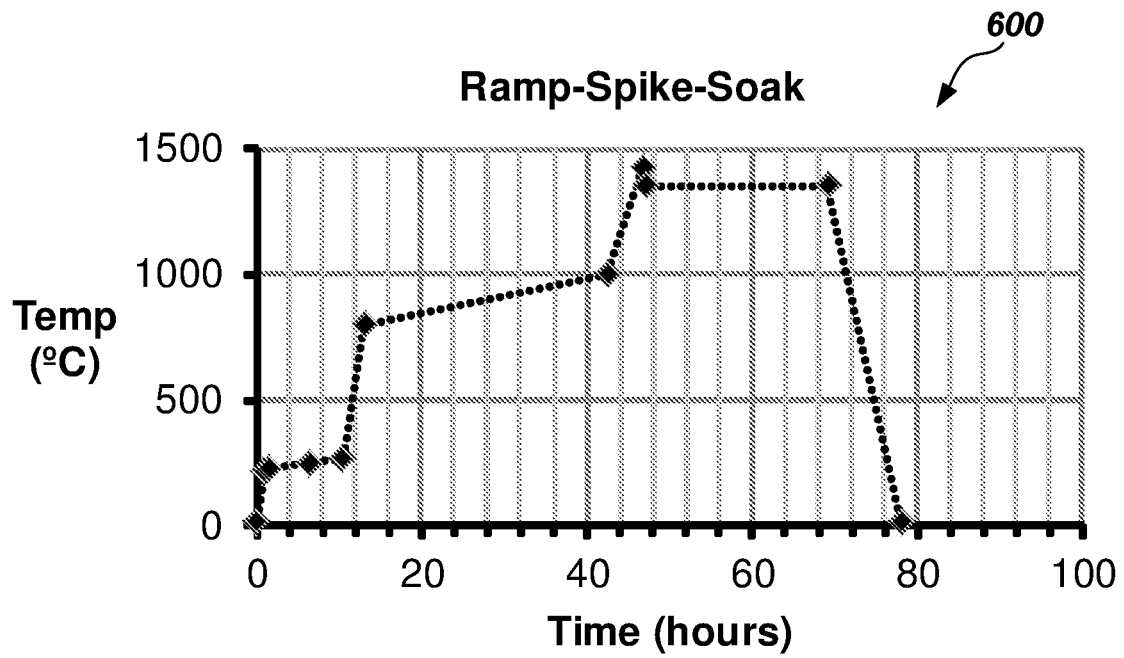
FIGS. 6-9 illustrate examples of various thermal spike-containing firing cycles configured to produce a ceramic honeycomb structure with an outer portion with a first average bulk porosity, and an inner portion with a second average bulk porosity that is greater than the first average bulk porosity in accordance with this disclosure.
Figure 7:
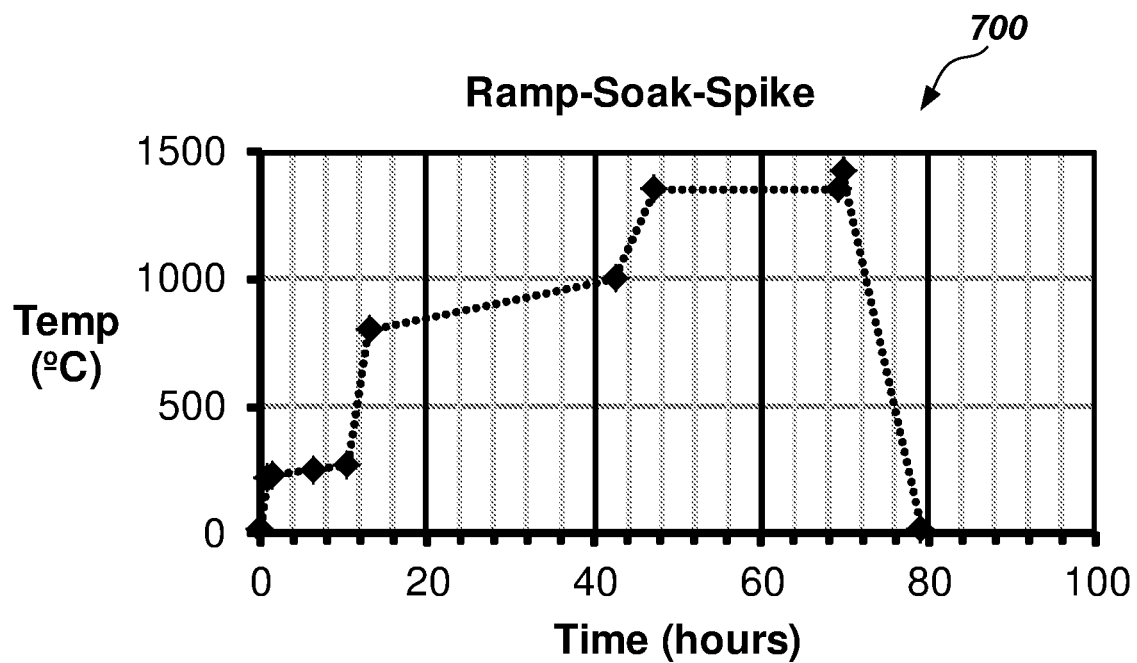
Figure 8:
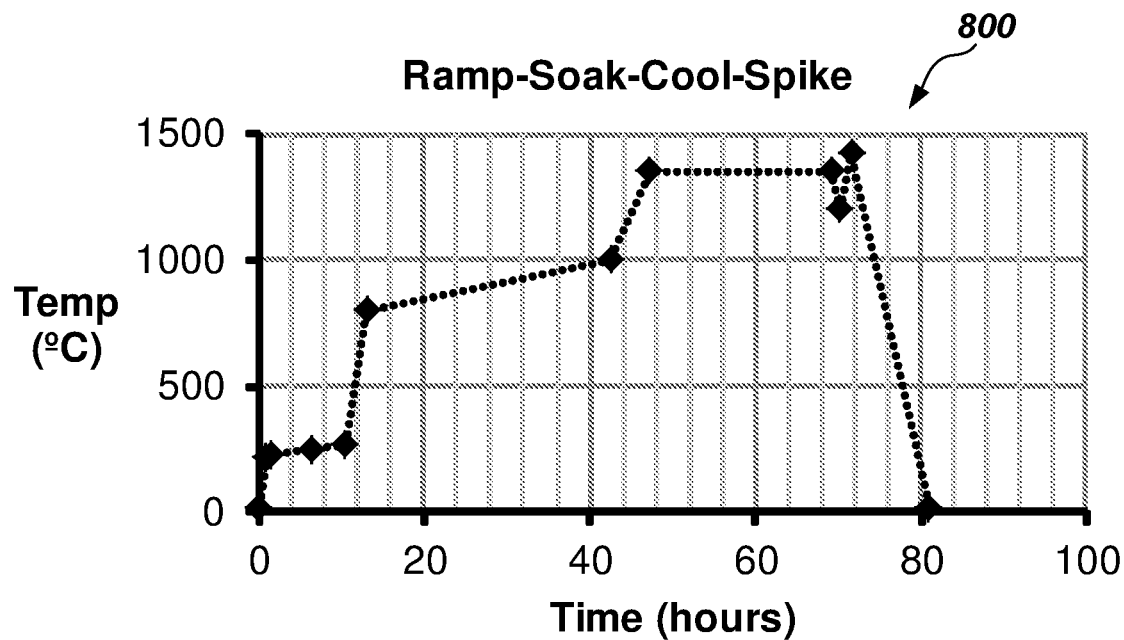
Figure 9:
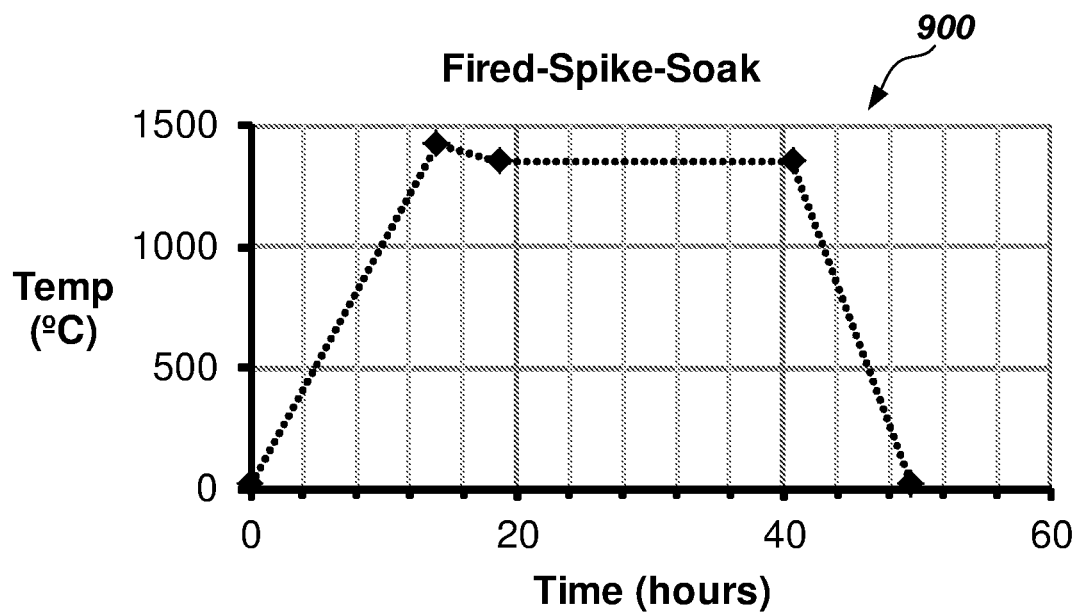

FIGS. 6-9 illustrate plots of representative firing cycles that can produce gradations in average bulk porosity from the interior portion 112 (e.g., a physical center) to an outer periphery of a matrix, such as at the skin 106. FIG. 6 illustrates a plot of an example of a "ramp-spike-soak" firing cycle. FIG. 7 illustrates a plot of an example of a "rampsoak-spike" firing cycle. FIG. 8 illustrates a plot of an example of a "ramp-soak-cool-spike" firing cycle. FIG. 9 illustrates a plot of an example of a "fired-spike-soak" firing cycle.

In the embodiments described herein, the spike temperature can be nominally 1,420° C. or 1,420° C.+/−5% in some embodiments, and the soak temperature can be nominally 1,350° C. or 1,350° C.+/−5%. The spike temperature can be at least 20° C. above the soak temperature, at least 40° C. above the soak temperature, at least 60° C. above the soak temperature, at least 80° C. above the soak temperature, or at least 100° C. above the soak temperature in some embodiments. The higher spike temperature can provide higher average bulk porosity differences between the interior 112 and the skin 106 and outer periphery of the ceramic honeycomb bodies 100, 110.

Although the above firing cycles are particularly useful for the firing of honeycomb bodies for exhaust after-treatment having wall thicknesses of less than 6 mils, the firing cycles may be used to produce average bulk porosity gradients in honeycomb bodies for other applications as well.

Although the terms first, second, etc., may be used herein to describe various elements, components, regions, parts or sections, these elements, components, regions, parts or sections, should not be limited by these terms. The terms may be used to distinguish one element, component, region, part or section, from another element, component, region, part or section. For example, a first element, component, region, part or section discussed above could be termed a second element, component, region, part or section without departing from the teachings of the present disclosure.

While embodiments of this disclosure have been disclosed in example forms, many modifications, additions, and deletions can be made therein without departing from the scope of this disclosure, as set forth in the subjoined claims and their equivalents.

What is claimed is:

1. A honeycomb firing method, comprising:
   providing a green honeycomb body comprising a honeycomb structure with a matrix of intersecting walls having an interior portion, and having a skin disposed on at least a portion of an outer periphery of the matrix; and
   firing the green honeycomb body in a furnace;
   wherein firing comprises:
      ramping up, at a first rate, a temperature in the furnace to reach a first temperature,
      after reaching the first temperature, ramping up, at a second rate, the temperature in the furnace to reach a spike temperature,
      after reaching the spike temperature, ramping down, at a third rate, the temperature in the furnace to reach a soak temperature,
      after reaching the soak temperature, maintaining the soak temperature for a predetermined period of time; and
      after the predetermined period of time, ramping down, at a fourth rate, the temperature in the furnace from the soak temperature to a handling temperature, and
   wherein, after firing, the interior portion of the matrix has a first average bulk porosity, and the skin has a second average bulk porosity that is less than the first average bulk porosity.

2. The method of claim 1, wherein providing the green honeycomb body comprises extruding the green honeycomb body comprising aluminum-titanate-forming batch mixture.

3. The method of claim 1, further comprising:
   controlling an oxygen level in the furnace by introducing nitrogen and/or recycling products of combustion into the furnace; and
   wherein the first rate is nonlinear throughout the ramping, the first temperature is 1,000° C. or greater, the second rate is nominally linear throughout the ramping, the spike temperature is 1,420° C.±5%, the third rate is nominally linear throughout the ramping, the soak temperature is 1,350° C. or greater, the fourth rate is nominally linear throughout the ramping, and the handling temperature is less than 400° C.

4. The method of claim 1, further comprising:
   varying an oxygen level in the furnace during at least a portion of a time required to ramp up the temperature in the furnace; and
   wherein the soak temperature is 1,350° C. or greater, the spike temperature is 1,420° C.±5%, the second rate is nominally 100° C./hour or greater throughout the ramping, the third rate is negative 150° C./hour or more negative throughout the ramping, the fourth rate is negative 150° C./hour or more negative throughout the ramping, and the handling temperature is less than 400° C.

5. The method of claim 1, further comprising:
   extruding the green honeycomb body wherein the matrix includes a halo portion adjacent to the skin.

6. A honeycomb firing method, comprising:
   providing a green honeycomb body comprising a honeycomb structure with a matrix of intersecting walls having an interior portion, and having a skin disposed on at least a portion of an outer periphery of the matrix; and
   firing the green honeycomb body in a furnace;
   wherein firing comprises:
      ramping up, at a first rate, a temperature in the furnace to a soak temperature,
      after reaching the soak temperature, maintaining the soak temperature for a predetermined period of time;
      after maintaining the soak temperature for the predetermined period of time, ramping up, at a second rate, the temperature in the furnace to reach a spike temperature,
      after reaching the spike temperature, ramping down, at a third rate, the temperature in the furnace to a handling temperature, and
   wherein, after firing, the interior portion of the matrix has a first average bulk porosity, and the skin has a second average bulk porosity that is less than the first average bulk porosity.

7. The method of claim 6, wherein providing the green honeycomb body comprises extruding the green honeycomb body comprising aluminum-titanate-forming batch mixture.

8. The method of claim 6, further comprising:
   controlling an oxygen level in the furnace by introducing nitrogen and/or recycling products of combustion into the furnace, and
   wherein the first rate is nonlinear or piecewise-linear throughout the ramping, the second rate is nominally linear throughout the ramping, the spike temperature is 1,420° C.±5%, the third rate is nominally linear throughout the ramping, the soak temperature is 1,350° C. or greater, and the handling temperature is less than 400° C.

9. The method of claim 6, further comprising:

varying an oxygen level in the furnace during at least a portion of a time required to ramp up the temperature in the furnace, and wherein the soak temperature is 1,350° C. greater, the spike temperature is 1,420° C.±5%, the second rate is 100° C./hour or greater throughout the ramping, the third rate is negative 150° C./hour or more negative throughout the ramping, and the handling temperature is less than 400° C.

10. The method of claim 6, further comprising:

extruding the green honeycomb body wherein the matrix comprises a halo portion adjacent to the skin.

11. A honeycomb firing method, comprising:

providing a green honeycomb body comprising a honeycomb structure with a matrix of intersecting walls having an interior portion, and having a skin disposed on at least a portion of an outer periphery of the matrix; and firing the green honeycomb body in a furnace;

wherein firing comprises:

ramping up, at a first rate, a temperature in the furnace to a soak temperature, after reaching the soak temperature, maintaining the soak temperature for a predetermined period of time;

after maintaining the soak temperature for the predetermined period of time, ramping down, at a second rate, the temperature in the furnace to reach a pre-spike temperature, after reaching the pre-spike temperature, ramping up, at a third rate, the temperature in the furnace to reach a spike temperature that is greater than the soak temperature, after reaching the spike temperature, ramping down, at a fourth rate, the temperature in the furnace from the spike temperature to a handling temperature, and wherein, after firing, the interior portion of the matrix has a first average bulk porosity, and the skin has a second average bulk porosity that is less than the first average bulk porosity.

12. The method of claim 11, wherein providing the green honeycomb body comprises extruding the green honeycomb body comprising an aluminum-titanate-forming batch mixture.

13. The method of claim 11, further comprising:

controlling an oxygen level in the furnace by introducing nitrogen and/or recycling products of combustion into the furnace, and wherein the first rate is nonlinear or piecewise-linear throughout the ramping, the second rate is nominally linear throughout the ramping, the spike temperature is 1,420° C.±5%, the third rate is nominally linear throughout the ramping, the soak temperature is 1,350° C.±5%, the fourth rate is nominally linear throughout the ramping, and the handling temperature is less than 400° C.

14. The method of claim 11, further comprising:

varying an oxygen level in the furnace during at least a portion of a time required to ramp up the temperature in the furnace, and wherein the soak temperature is 1,350° C. or greater, the spike temperature is 1,420° C.±5%, the second rate is 100° C./hour or greater throughout the ramping, the third rate is negative 150° C./hour or more negative throughout the ramping, the fourth rate is negative 150° C./hour or more negative throughout the ramping, and the handling temperature is less than 400° C.

15. The method of claim 11, further comprising:

extruding the green honeycomb body wherein the matrix includes a halo region adjacent to the skin.

* * * * *

UNITED STATES PATENT AND TRADEMARK OFFICE
CERTIFICATE OF CORRECTION

PATENT NO. : 11,932,582 B2
APPLICATION NO. : 17/256903
DATED : March 19, 2024
INVENTOR(S) : Douglas Munroe Beall et al.

Page 1 of 1

It is certified that error appears in the above-identified patent and that said Letters Patent is hereby corrected as shown below:

In the Claims

In Column 17, Line 5, in Claim 9, insert -- or -- between "1,350° C." and "greater".

Signed and Sealed this
Twenty-second Day of July, 2025

Coke Morgan Stewart
*Acting Director of the United States Patent and Trademark Office*